(12) United States Patent
Seo et al.

(10) Patent No.: US 11,014,050 B2
(45) Date of Patent: May 25, 2021

(54) ION EXCHANGE MEMBRANE AND FILTER MODULE USING SAME

(71) Applicant: AMOGREENTECH CO., LTD., Gimpo-si (KR)

(72) Inventors: In Yong Seo, Seoul (KR); Jun Sik Hwang, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 109 days.

(21) Appl. No.: 16/429,428

(22) Filed: Jun. 3, 2019

(65) Prior Publication Data

US 2019/0282966 A1    Sep. 19, 2019

Related U.S. Application Data

(63) Continuation-in-part of application No. 15/097,579, filed on Apr. 13, 2016, now abandoned, which is a
(Continued)

(30) Foreign Application Priority Data

Nov. 12, 2013    (KR) .................. 10-2013-0136783

(51) Int. Cl.
*B01D 63/06* (2006.01)
*B01D 63/10* (2006.01)
(Continued)

(52) U.S. Cl.
CPC ....... *B01D 67/0002* (2013.01); *B01D 63/061* (2013.01); *B01D 63/10* (2013.01);
(Continued)

(58) Field of Classification Search
CPC ........ B01D 2323/39; B01D 2323/0631; B01D 2239/0636; B01D 2323/26
See application file for complete search history.

(56) References Cited

U.S. PATENT DOCUMENTS 4,163,716 A    8/1979    Turnbull
5,670,550 A    9/1997    Jarvinen et al.
(Continued)

FOREIGN PATENT DOCUMENTS

EP    2589422        5/2013
EP    2589422 A2 *  5/2013    ......... B01D 39/1623
(Continued)

OTHER PUBLICATIONS

Soares et al. "Electrospinning and electrospray of bio-based and natural polymers for biomaterials development" (Materials Science & Engineering C, 92, 2018, p. 969-982) (Year: 2018).*
(Continued)

*Primary Examiner* — Ryan B Huang
(74) *Attorney, Agent, or Firm* — Cantor Colburn LLP

(57) ABSTRACT

Provided is a method of forming a filter module. The method includes: forming a non-pore ion-exchange membrane including: preparing a mixed solution of a polymer material and an ion-exchange material; and electrospraying the mixed solution to obtain the non-pore ion-exchange membrane; and interposing the non-pore ion-exchange membrane between a first polymer nanofiber web and a second polymer nanofiber web to form the filter module.

12 Claims, 5 Drawing Sheets

Related U.S. Application Data continuation-in-part of application No. PCT/KR2014/010824, filed on Nov. 12, 2014.

(51) Int. Cl.

| | |
|---|---|
| *B01D 63/14* | (2006.01) |
| *B01D 67/00* | (2006.01) |
| *B01D 69/02* | (2006.01) |
| *B01J 39/05* | (2017.01) |
| *B01J 39/18* | (2017.01) |
| *B01J 41/07* | (2017.01) |
| *B01J 41/12* | (2017.01) |
| *B01J 47/12* | (2017.01) |
| *C02F 1/469* | (2006.01) |
| *D01D 5/00* | (2006.01) |
| *D04H 1/728* | (2012.01) |

(52) U.S. Cl.
CPC .......... *B01D 63/14* (2013.01); *B01D 69/02* (2013.01); *B01J 39/05* (2017.01); *B01J 39/18* (2013.01); *B01J 41/07* (2017.01); *B01J 41/12* (2013.01); *B01J 47/12* (2013.01); *D01D 5/003* (2013.01); *D04H 1/728* (2013.01); *B01D 2323/39* (2013.01); *B01D 2325/08* (2013.01); *B01D 2325/18* (2013.01); *B01D 2325/42* (2013.01); *C02F 1/4691* (2013.01); *C02F 1/4693* (2013.01); *C02F 2201/46* (2013.01); *D10B 2505/04* (2013.01)

(56) References Cited

U.S. PATENT DOCUMENTS

| | | | |
|---|---|---|---|
| 6,508,962 | B1 | 1/2003 | Economy et al. |
| 7,655,070 | B1 | 2/2010 | Dallas et al. |
| 8,007,953 | B2 | 8/2011 | Tanuma |
| 9,220,998 | B2 | 12/2015 | Seo et al. |
| 2006/0068668 | A1* | 3/2006 | Kameoka ............ D01D 5/0069 442/340 |
| 2013/0112618 | A1 | 5/2013 | Diallo et al. |

FOREIGN PATENT DOCUMENTS

| | | |
|---|---|---|
| JP | 2010095825 | 4/2010 |
| KR | 20040000058 | 1/2004 |
| KR | 20070099926 | 10/2007 |
| KR | 20110114597 | 10/2011 |
| KR | 20120002491 | 1/2012 |
| KR | 20120078363 | 7/2012 |
| WO | 2009044766 | 4/2009 |
| WO | 2012002754 | 1/2012 |

OTHER PUBLICATIONS

International Search Report—PCT/KR2014/010824 dated Mar. 11, 2015.

* cited by examiner

ION EXCHANGE MEMBRANE AND FILTER MODULE USING SAME

TECHNICAL FIELD

The present invention relates to an ion-exchange membrane, and more particularly, to an ultra-thin ion-exchange membrane that is formed by electrospinning or electrospraying an ion-exchange solution, and a filter module using the same.

BACKGROUND ART

In general, only 0.0086% of all the earth's water volume may be used. When considering disasters due to climate change in mind, water may not be available enough.

Water is very important to human life and is used variously as water for living or industrial water. Water may be contaminated with heavy metals, nitrate, fluoride, etc., due to industrial development and it is very harmful to health to drink contaminated water.

Recently, deionization technologies for purifying contaminated water and sea water for use as agricultural, industrial, or irrigation water have been variously studied.

These deionization technologies are techniques for deionization or deionization of water by removing various suspended solids or ion components contained in the sea water or polluted water such as waste water, and may employ an evaporation method to evaporate water by using a heat source such as fossil fuels or electric power, a filtration method to filter and remove foreign materials by using a separation membrane, or an electrodialysis method to remove ions by using an electrolytic action of an electrode cell.

The evaporation method evaporates moisture by using fossil fuels or electricity as a heat source, is inefficient due to the large volume of the deionization equipment, increases the manufacturing cost due to an increase in the consumption of energy, and causes contamination of air due to the use of fossil fuels.

The filtration method removes foreign matters by applying a high pressure to a separator and thus the cost of energy increases.

The electrodialysis method has to constantly replace an electrode cell with another, and does not only generate a waste factor due to the replacement of the electrode cell but also has the disadvantage of increasing human and material incidental expenses in accordance with the replacement of the electrode cell.

Korean Patent Registration Publication No. 501417 discloses a waste water deionization apparatus using a reverse osmosis membrane method/electrode method, the waste water deionization apparatus comprising: a reverse osmosis membrane device to primarily remove salt components from water to be treated in which the water to be treated is introduced with a predetermined pressure into the reverse osmosis membrane device; a deionization electrode device that secondarily removes salt components from the water that has been primarily processed in the reverse osmosis membrane device in which a spacer, a positive electrode and a negative electrode are sequentially provided in a cylindrical tank; an energy recovery device for utilizing a brine-side pressure of the reverse osmosis membrane device for use to pressurize inlet water of the deionization electrode device; a power supply device for supplying power to the positive electrode and the negative electrode provided in the deionization electrode device; and a controller for controlling valves provided in pipes through which the water to be process in order to perform a deionization process for deionizing the water to be treated in which the water to be treated is introduced into the deionization electrode device, and a reproduction process for desorbing ions adsorbed to the electrode during the deionization process. However, such a waste water deionization apparatus includes the reverse osmosis membrane device and the deionization electrode device individually and thus may cause the large size of the deionization apparatus and require a lot of manufacturing cost.

Thus, the present inventors have consistently proceeded with a study on a technique of implementing an ultra-thin membrane, to thus derive and invent methodical and structural features capable of applying a porous membrane to a chemical filter and a non-pore membrane to a deionization apparatus, to thereby have completed the present invention that is more economical, and possibly utilizable, and competitive.

SUMMARY OF THE INVENTION

To solve the above problems or defects, it is an object of the present invention to provide an ion-exchange membrane configured into a membrane of a structure that is formed by electrospinning an ion-exchange solution and accumulating nanofibers of an ion-exchange material, to thereby perform a surface filtration achieved in a surface layer and a depth filtration achieved in an inner layer, and filter out particular ions of a chemical material included in water to be treated by using the ion-exchange material of the nanofibers, and a filter module using the same.

It is another object of the present invention to provide an ion-exchange membrane configured into a non-pore membrane that is formed by electrospraying an ion-exchange solution and accumulating sprayed liquid droplets, thereby omitting a drying step while achieving an ultra-thin film.

The objects of the present invention are not limited to the above-described objects, and other objects and advantages of the present invention can be appreciated by the following description and will be understood more clearly by embodiments of the present invention.

To accomplish the above and other objects of the present invention, according to an aspect of the present invention, there is provided an ion-exchange membrane comprising: a porous membrane that is formed by accumulating nanofibers obtained by electrospinning an ion-exchange solution, or a non-pore membrane that is formed by accumulating liquid droplets obtained by electrospraying an ion-exchange solution.

In addition, according to another aspect of the present invention, there is provided a flat plate-like filter module that is configured to have a flat plate-like structure that is formed by laminating a porous ion-exchange membrane with one or both of a nonwoven fabric and a polymer nanofiber web, or that is formed by repeatedly laminating the porous ion-exchange membrane, in which the porous ion-exchange membrane is formed by accumulating nanofibers obtained by electrospinning an ion-exchange solution.

In addition, according to still another aspect of the present invention, there is provided a pleat-like filter module that is configured to comprise a porous ion-exchange membrane that is formed by accumulating nanofibers obtained by electrospinning an ion-exchange solution, a tubular body with a throughhole formed therein, and pleats that are formed on side walls of the throughhole and an outer circumferential surface of the tubular body.

In addition, according to yet another aspect of the present invention, there is provided a spirally wound type filter module that is configured to have a spiral structure that is formed by spirally winding a structure that is formed by laminating a porous ion-exchange membrane with one or both of a nonwoven fabric and a polymer nanofiber web, or by spirally winding the porous ion-exchange membrane, in which the porous ion-exchange membrane is formed by accumulating nanofibers obtained by electrospinning an ion-exchange solution.

As described above, according to the present invention, a porous ion-exchange membrane is formed by laminating and arranging nanofibers obtained by electrospinning an ion-exchange material, to thereby have advantages of filtering nano-scale fine contaminants included in water to be treated when the water to be treated passes through micropores present in the porous ion-exchange membrane, and filtering ions of a chemical material with the ion-exchange material included in the nanofibers.

In addition, according to the present invention, a non-pore ion-exchange membrane of a uniform non-pore film form without having unnecessary pores may be formed by electrospraying an ion-exchange solution and accumulating the electrosprayed liquid droplets, to thus provide an effect capable of maximizing productivity since a separate drying process is unnecessary.

In addition, according to the present invention, a non-pore ion-exchange membrane of a non-pore film form of a dense structure may be implemented and may have an ultra-thin structure by electrospinning or electrospraying an ion-exchange solution, to thus have advantages that only selected ions can move freely and lower moving resistance of ions.

DETAILED DESCRIPTION OF THE INVENTION

Figure 1:
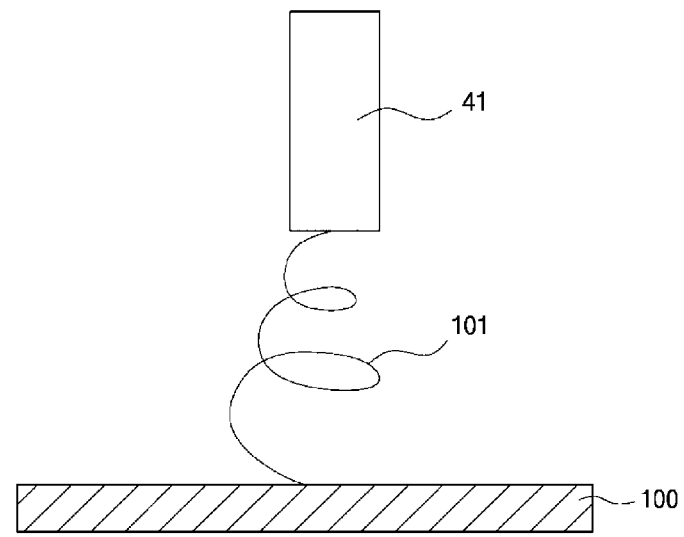
FIG. 1 is a schematic cross-sectional view for explaining a method of producing a porous ion-exchange membrane according to a first embodiment of the present invention.

Hereinafter, embodiments of the present invention will be described in detail with reference to the accompanying drawings. In the process, the size and shape of the components illustrated in the drawings may be exaggerated for convenience and clarity of explanation. Further, by considering the configuration and operation of the present invention, the specifically defined terms can be changed according to user's or operator's intention, or the custom. Definitions of these terms herein need to be made based on the contents across the whole application.

Referring to FIG. 1, according to a first embodiment of the present invention, a porous ion-exchange membrane 100 is formed by electrospinning an ion-exchange solution from a nozzle 41 and accumulating nanofibers 101 obtained by electrospinning the ion-exchange solution.

Figure 2:
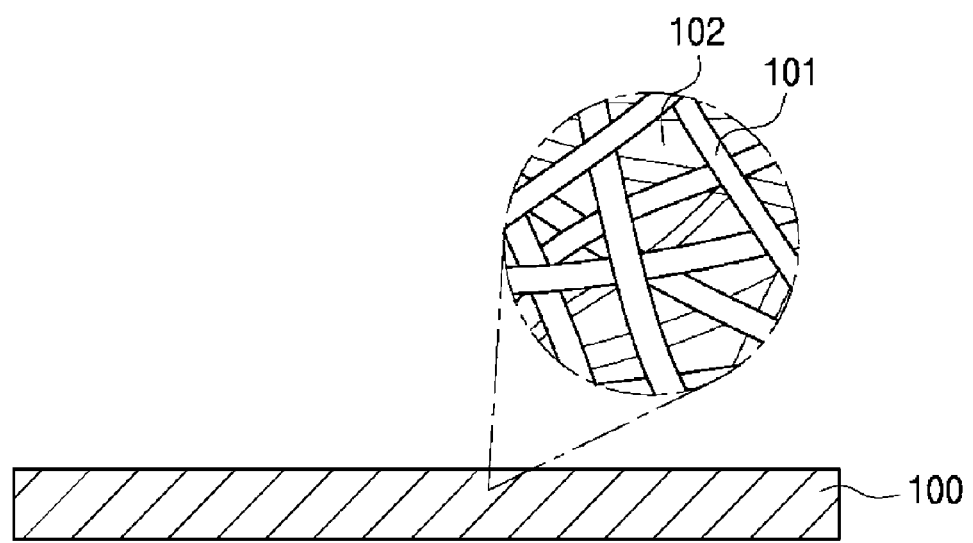
FIG. 2 is a conceptual view illustrating a porous ion-exchange membrane according to the first embodiment of the present invention.

The porous ion-exchange membrane 100 is formed by irregularly accumulating the spun nanofibers 101. As shown in FIG. 2, a large number of fine pores 102 are formed between the nanofibers 101 of the porous ion-exchange membrane 100.

Thus, the porous ion-exchange membrane 100 filters nano-scale fine contaminants included in water to be treated when the water to be treated passes through micropores present in the porous ion-exchange membrane 100, and filters ions of a chemical material.

That is, the porous ion-exchange membrane 100 are made of nanofibers of the ion-exchange material, to thus perform a surface filtration achieved in a surface layer and a depth filtration achieved in an inner layer, and filter out particular ions of a chemical material included in water to be treated by using the ion-exchange material of the nanofibers.

Thus, the porous ion-exchange membrane 100 according to embodiments of the present invention may be used as a chemical filter capable of filtering impurities such as particulate matters, ionic substances, bacteria, and viruses from a liquid comprising water to be used in a process that is carried out in most of industrial fields.

Meanwhile, the ion-exchange solution contains ion exchangers such as $SO_3^-$ and $NH_3^+$, and the ion exchangers are attached to nanofibers of the porous ion-exchange membrane 100 that is formed by electrospinning the ion-exchange solution. Therefore, the present invention has an advantage of filtering fine ionic materials by adsorption performance of the ion exchangers without reducing the pore size. Here, the ion exchangers are negative ion exchangers or positive ion exchangers.

Figure 3:
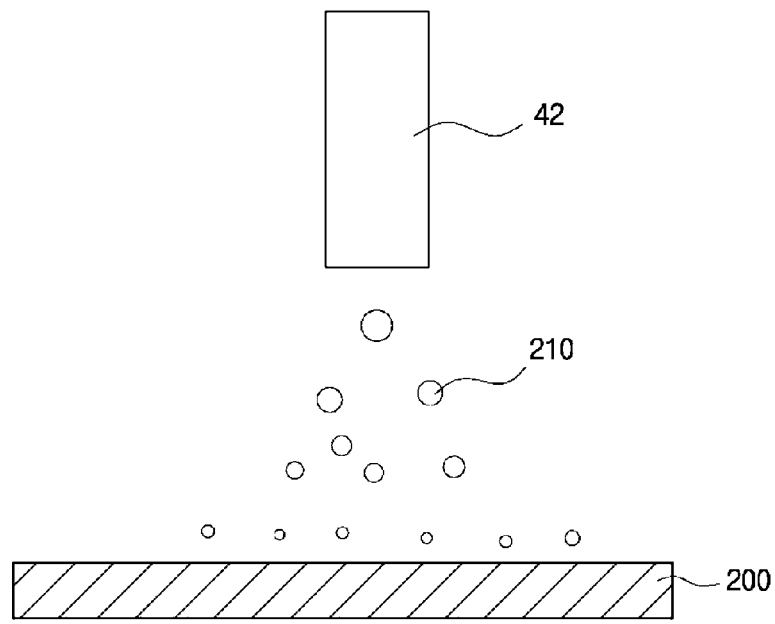
FIG. 3 is a schematic cross-sectional view for explaining a method of manufacturing a non-pore ion-exchange membrane according to a second embodiment of the present invention.

FIG. 3 is a schematic cross-sectional view for explaining a method of manufacturing a non-pore ion-exchange membrane ball according to a second embodiment of the present invention.

Referring to FIG. 3, according to the second embodiment of the present invention, a non-pore ion-exchange membrane 200 is formed by electrospraying an ion-exchange solution from a nozzle 42, and accumulating the sprayed liquid droplets 210.

That is, when the ion-exchange solution is electrosprayed, liquid droplets of fine size are sprayed from a nozzle 42 that electrosprays the ion-exchange solution, and the initially sprayed liquid droplets are fine-differentiated by electric power. In addition, the liquid droplets are sprayed from the nozzle and simultaneously a majority of a solvent is volatilized. Accordingly, only the liquid droplets 101 of the ion-exchange material are accumulated. Therefore, a non-pore ion-exchange membrane 200 of a uniform non-pore film form without having unnecessary pores may be formed to thus maximize productivity since a separate drying process is unnecessary.

In addition, in some embodiments of the present invention, a non-pore ion-exchange membrane 200 is formed by electrospraying an ion-exchange solution and accumulating the sprayed liquid droplets, to thereby have a non-pore film form of a dense structure and have an ultra-thin structure, to thus have advantages that only selected ions can move freely and lower moving resistance of ions.

Meanwhile, a polymer material and an ion-exchange solution may be mixed and electrosprayed to improve properties of matter, to thereby form a non-pore ion-exchange membrane 200. In this case, the non-pore ion-exchange membrane 200 is formed of a thin film in which the polymer material is mixed with the ion-exchange material.

In some embodiments of the present invention, the non-pore ion-exchange membrane 200 has a form that pores do not exist therein, thereby increasing selective permeability of ions. On the contrary, the ion-exchange membranes having pores have no preferred structures since both positive and negative ions can pass through the pores despite electrical attraction or repulsion.

The non-pore ion-exchange membrane 200 may be a positive ion-exchange membrane or a negative ion-exchange membrane according to polarities of electrodes, and the non-pore ion-exchange membrane 200 serves to selectively adsorb ions to the electrodes. That is, the negative ion-exchange membrane is coupled to a positive electrode, and the positive ion-exchange membrane is coupled to a negative electrode. Thus, when a voltage is applied across the positive electrode and the negative electrode, only positive ions are adsorbed in the negative electrode, and only negative ions are adsorbed in the positive electrode.

Therefore, since the non-pore ion-exchange membrane 200 is a non-porous thin film that is formed by accumulating liquid droplets formed by electrospraying the ion-exchange solution, the non-pore ion-exchange membrane 200 may be made very thin and uniform, to thereby improve adsorption and desorption efficiency of ions.

After the capacitive deionization device has adsorbed ions from one electrode, the non-pore ion-exchange membrane 200 is effective to prevent ions desorbed from the capacitive deionization device from being re-adsorbed to the other electrode.

Therefore, the non-pore ion-exchange membrane according to the second embodiment of the present invention may be applied to electric deionization devices such as CDI (Capacitive deionization), ED (Electrodialysis), EDR (Electrodialysis reversal), and RED (Reverse electrodialysis).

Figure 4:
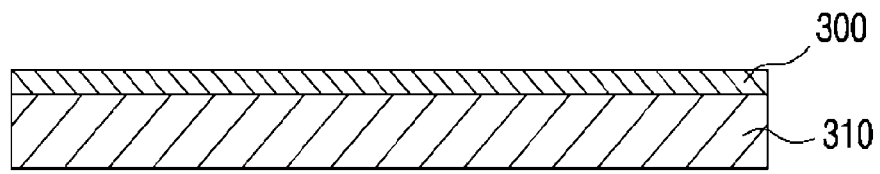
FIG. 4 is a conceptual view illustrating a lamination structure of the ion-exchange membrane according to the first and second embodiments of the present invention.

Referring to FIG. 4, the ion-exchange membrane 300 according to the first and second embodiments of the present invention may be configured to have a lamination structure laminated with a nonwoven fabric 310 to compensate for mechanical strength.

Figure 5:
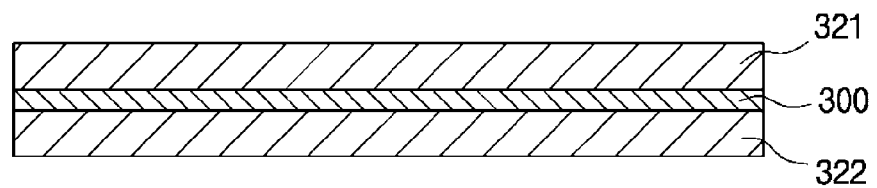
FIG. 5 is a conceptual view illustrating another lamination structure of the ion-exchange membrane according to the first and second embodiments of the present invention.

As shown in FIG. 5, the ion-exchange membrane 300 according to the first and second embodiments of the present invention may be interposed between a first polymer nanofiber web 321 and a second polymer nanofiber web 322 to improve properties of matter.

In addition, the ion-exchange membrane 300 according to the first and second embodiments of the present invention is formed on the polymer nanofiber web 320 and then be laminated with a nonwoven fabric 310.

Figure 6A:
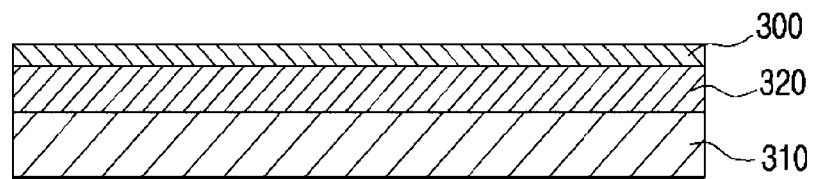
FIGS. 6A and 6B are conceptual views illustrating still another lamination structure of the ion-exchange membrane according to the first and second embodiments of the present invention.

In this case, FIG. 6A illustrates a structure that a polymer nanofiber web 320 and an ion-exchange membrane 300 are sequentially laminated on a nonwoven fabric 310. Here, since a polymer nanofiber web 320 is in contact with and is laminated on the nonwoven fabric 310, a contact interface is formed between the polymer nanofiber web 320 and the nonwoven fabric 310.

Figure 6B:
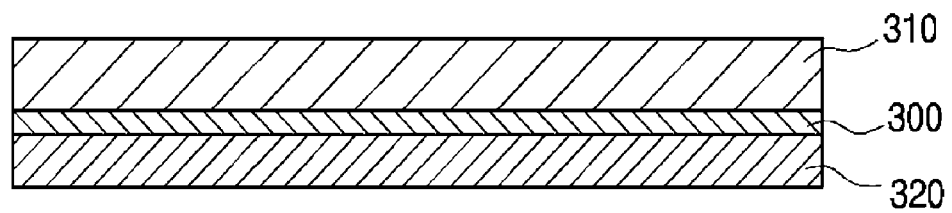

In addition, FIG. 6B illustrates a structure that a polymer nanofiber web 320 and an ion-exchange membrane 300 are sequentially laminated on a nonwoven fabric 310, in which the ion-exchange membrane 300 is in contact with the nonwoven fabric 310.

Meanwhile, the porous ion-exchange membrane according to embodiments of the present invention as described above is excellent in flexibility by accumulating nanofibers of the ion-exchange material, to thus have very flexible characteristics, and to thereby implement a filter module of a variety of assembly shapes such as a flat plate-like filter module 510, a pleat-like filter module 520, and a spirally wound type filter module 530.

Figure 7A:
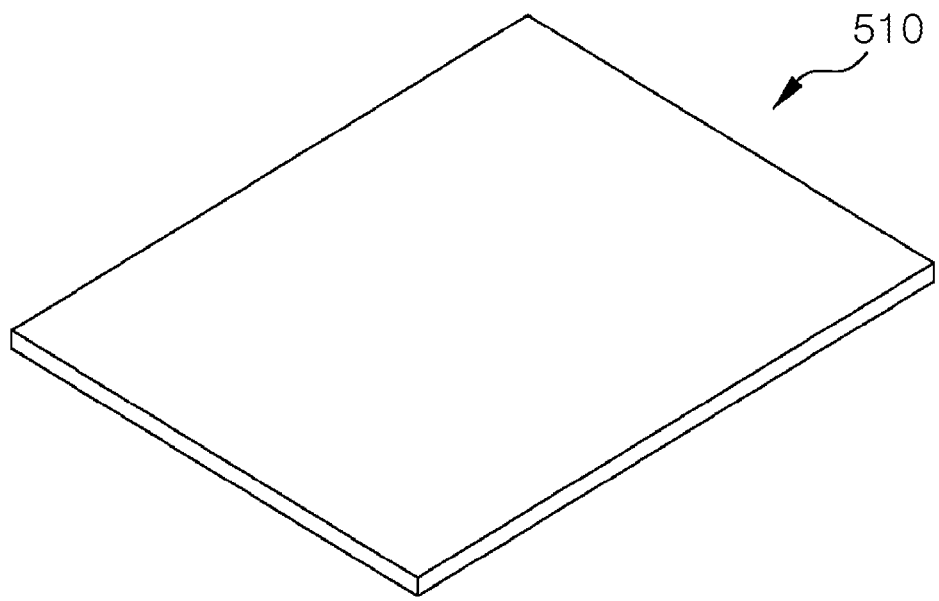
FIGS. 7A to 7C are conceptual perspective views illustrating an assembled state of a filter module with the porous ion-exchange membrane according to embodiments of the present invention.

As shown in FIG. 7A, according to an assembly shape of the filter module, the filter module is implemented into a flat plate-like filter module 510 that is formed by laminating a porous ion-exchange membrane with one or both of a nonwoven fabric and a polymer nanofiber web, or that is formed by repeatedly laminating the porous ion-exchange membrane, in which the porous ion-exchange membrane is formed by accumulating nanofibers obtained by electrospinning an ion-exchange solution.

Figure 7B:
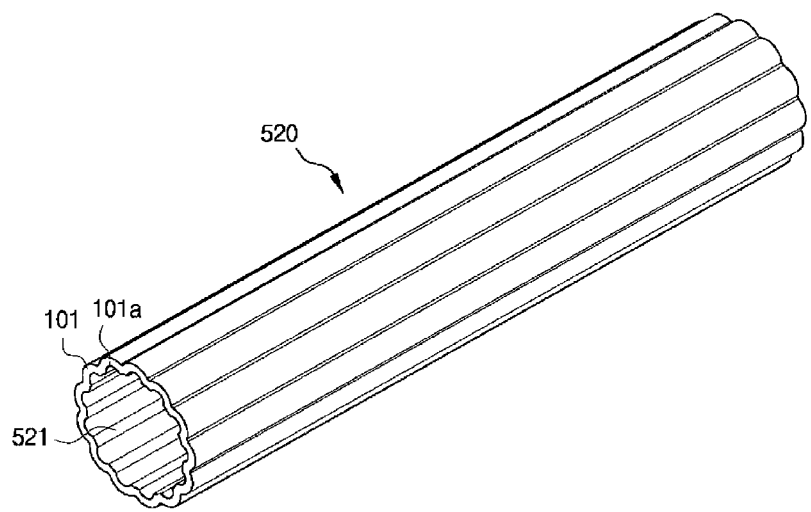

In addition, as shown in FIG. 7B, according to another assembly shape of the filter module, the filter module is implemented into a pleat-like filter module 520 that is configured to comprise a porous ion-exchange membrane that is formed by accumulating nanofibers 101 obtained by electrospinning an ion-exchange solution, a tubular body with a throughhole 521 formed therein, and pleats that are formed on side walls of the throughhole 521 and an outer circumferential surface of the tubular body.

Here, the tubular body has a length greater than the diameter thereof. In some embodiments of the present invention, a plurality of grooves 101a may be formed in the inner side wall of the throughhole 521, and pleated shapes may be made on the inner side wall of the throughhole 521 by the plurality of grooves 101a. In this case, the plurality of grooves 101a may be formed in at least one pattern shape selected from among a straight linear pattern, a curved pattern, a mixed pattern of the straight linear pattern and the curved pattern, a polygonal pattern, a grid-like pattern, a dot-like pattern, a rhombic pattern, a parallelogram pattern, a mesh-like pattern, a striped-like pattern, a cross pattern, a radial pattern, a circular pattern, and a mixed pattern of a plurality of patterns selected from among the straight linear pattern, the curved pattern, the mixed pattern of the straight linear pattern and the curved pattern, the polygonal pattern, the grid-like pattern, the dot-like pattern, the rhombic pattern, the parallelogram pattern, the mesh-like pattern, the striped-like pattern, the cross pattern, the radial pattern, and the circular pattern.

In addition, the tubular body is formed of a porous membrane that is formed by accumulating nanofibers obtained by electrospinning an ion-exchange solution.

Figure 7C:
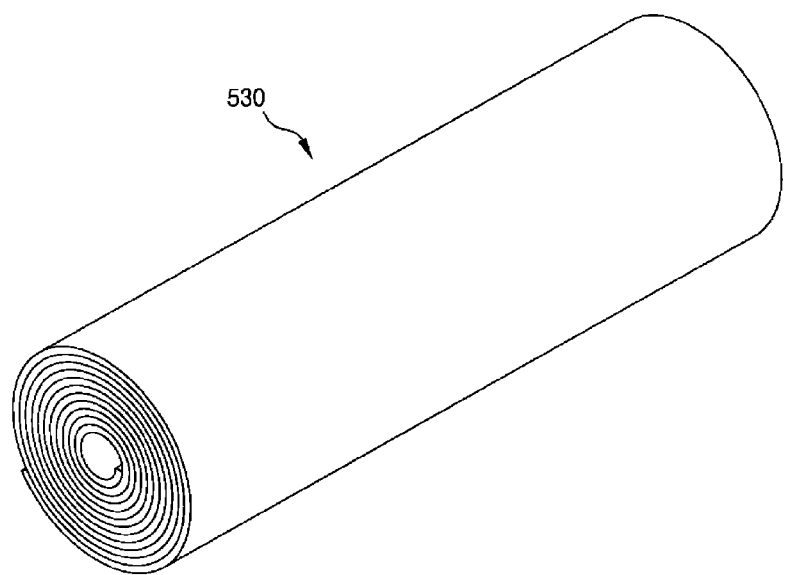

In addition, as shown in FIG. 7C, according to still another assembly shape of the filter module, the filter module is implemented into a spirally wound type filter module that is configured to have a spiral structure that is formed by spirally winding a structure that is formed by laminating a porous ion-exchange membrane with one or both of a nonwoven fabric and a polymer nanofiber web, or by spirally winding the porous ion-exchange membrane, in which the porous ion-exchange membrane is formed by accumulating nanofibers obtained by electrospinning an ion-exchange solution. That is, the filter module 530 is assembled in a spirally wound type.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention may provide an ion-exchange membrane that is formed by accumulating nanofibers of an ion-exchange material obtained by electrospinning an ion-exchange solution, to thereby perform a surface filtration achieved in a surface layer and a depth filtration achieved in an inner layer, and filter out particular ions of a chemical material included in water to be treated by using the ion-exchange material of the nanofibers

What is claimed are:

1. A method of forming a filter module, the method comprising:
    forming a non-pore ion-exchange membrane comprising:
    preparing a mixed solution of a polymer material and an ion-exchange material; and
    electrospraying the mixed solution to obtain the non-pore ion-exchange membrane; and
    interposing the non-pore ion-exchange membrane between a first polymer nanofiber web and a second polymer nanofiber web to form the filter module.

2. The method of claim 1, wherein the ion-exchange solution comprises a negative ion exchanger.

3. The method of claim 1, wherein the ion-exchange solution comprises a positive ion exchanger.

4. The method of claim 1, further comprising: spirally winding the filter module.

5. The method of claim 1, further comprising: shaping the filter module into a tubular body with a throughhole therein and pleats on a side wall of the throughhole and an outer circumferential surface of the tubular body.

6. The method of claim 5, wherein the shaping of the filter module comprises: forming a plurality of grooves in the side wall of the throughhole.

7. The method of claim 6, wherein the forming of the plurality of grooves comprises: forming in at least one pattern shape selected from among a straight linear pattern, a curved pattern, a mixed pattern of the straight linear pattern and the curved pattern, a polygonal pattern, a grid-like pattern, a dot-like pattern, a rhombic pattern, a parallelogram pattern, a mesh-like pattern, a striped-like pattern, a cross pattern, a radial pattern, a circular pattern, and a mixed pattern of a plurality of patterns selected from among the straight linear pattern, the curved pattern, the mixed pattern of the straight linear pattern and the curved pattern, the polygonal pattern, the grid-like pattern, the dot-like pattern, the rhombic pattern, the parallelogram pattern, the mesh-like pattern, the striped-like pattern, the cross pattern, the radial pattern, and the circular pattern.

8. The method of claim 1, further comprising: laminating the filter module to form a laminated filter module.

9. The method of claim 8, further comprising: spirally winding the laminated filter module.

10. The method of claim 8, further comprising: shaping the laminated filter module into a tubular body with a throughhole therein and pleats on a side wall of the throughhole and an outer circumferential surface of the tubular body.

11. The method of claim 10, wherein the shaping of the laminated filter module comprises: forming a plurality of grooves in the side wall of the throughhole.

12. The method of claim 11, wherein the forming of the plurality of grooves comprises: forming in at least one pattern shape selected from among a straight linear pattern, a curved pattern, a mixed pattern of the straight linear pattern and the curved pattern, a polygonal pattern, a grid-like pattern, a dot-like pattern, a rhombic pattern, a parallelogram pattern, a mesh-like pattern, a striped-like pattern, a cross pattern, a radial pattern, a circular pattern, and a mixed pattern of a plurality of patterns selected from among the straight linear pattern, the curved pattern, the mixed pattern of the straight linear pattern and the curved pattern, the polygonal pattern, the grid-like pattern, the dot-like pattern, the rhombic pattern, the parallelogram pattern, the mesh-like pattern, the striped-like pattern, the cross pattern, the radial pattern, and the circular pattern.

* * * * *